US008977766B2

(12) United States Patent
Peters et al.

(10) Patent No.: US 8,977,766 B2
(45) Date of Patent: Mar. 10, 2015

(54) SCALABILITY AND REDUNDANCY ENHANCEMENTS FOR CONTENT STREAMING

(75) Inventors: Robert J. Peters, Santa Monica, CA (US); Jayson G. Sakata, Encino, CA (US); Lior Elazary, Agoura Hills, CA (US)

(73) Assignee: Edgecast Networks, Inc., Santa Monica, CA (US)

( * ) Notice: Subject to any disclaimer, the term of this patent is extended or adjusted under 35 U.S.C. 154(b) by 1008 days.

(21) Appl. No.: 12/887,487

(22) Filed: Sep. 21, 2010

(65) Prior Publication Data

US 2012/0072608 A1 Mar. 22, 2012

(51) Int. Cl.
*G06F 15/173* (2006.01)
*H04L 29/08* (2006.01)
*H04L 29/06* (2006.01)

(52) U.S. Cl.
CPC ........ *H04L 67/1008* (2013.01); *H04L 65/4084* (2013.01); *H04L 67/1034* (2013.01)
USPC ....................................................... 709/231

(58) Field of Classification Search
CPC ........................ H04L 65/4084; H04L 67/1008
USPC ....................................................... 709/231
See application file for complete search history.

(56) References Cited

U.S. PATENT DOCUMENTS

| 6,108,703 | A | 8/2000 | Leighton et al. |
| 6,415,368 | B1 | 7/2002 | Glance et al. |
| 6,463,508 | B1 | 10/2002 | Wolf et al. |
| 6,553,413 | B1 | 4/2003 | Leighton et al. |
| 7,103,645 | B2 | 9/2006 | Leighton et al. |
| 2004/0078481 | A1 | 4/2004 | Rudd et al. |
| 2005/0262246 | A1* | 11/2005 | Menon et al. ........... 709/226 |
| 2008/0072264 | A1* | 3/2008 | Crayford ................. 725/86 |
| 2012/0041970 | A1* | 2/2012 | Ghosh et al. ........... 707/769 |

* cited by examiner

*Primary Examiner* — Joon H Hwang
*Assistant Examiner* — Suraj Joshi

(57) ABSTRACT

Some embodiments provide methods and systems for improving the scalability and redundancy of a distributed content streaming system. Such scalability and redundancy is provided with zero configuration changes to the addressing used by content providers to publish content and zero configuration changes to existing servers of the system. The system includes ingest servers and edge servers. Content providers supply content streams to the ingest servers using a virtual or load balanced address that distributes the content streams across the ingest servers. Accordingly, ingest servers can be added or removed without changing content provider configurations. The ingest servers are configured to notify the edge servers of which content streams are available for streaming at which ingest server. When an ingest server is added to the system, its functionality may be assimilated without modifying the configurations of the other servers. Some embodiments also provide multiple caching layers.

18 Claims, 9 Drawing Sheets

SCALABILITY AND REDUNDANCY ENHANCEMENTS FOR CONTENT STREAMING

TECHNICAL FIELD

The present invention relates to systems and methods for improving content streaming from a set of servers that are deployed over a wide area data network.

BACKGROUND ART

With continued deployments of higher speed connectivity and new devices that leverage such connectivity, content providers are extending beyond static content to offer streaming content. Streaming content includes live or on-demand video streams and audio streams of sporting events, news, television programming, movies, and other such multimedia content. High speed data networks such as 3G and 4G wireless data networks (e.g., Worldwide Interoperability for Microwave Access (WiMAX) and Long Term Evolution (LTE)) and broadband wired data networks provide the medium through which the content is streamed to end user devices. These devices include cellular telephones, smartphones such as the iPhone®, tablet devices such as the iPad™, portable digital assistants (PDAs), notebook computing systems, laptop computing systems, and desktop computing systems as some examples.

However, in many instances, the connectivity and/or end user device resources do not provide an acceptable or high quality user experience when receiving and rendering streaming content. As a result, various enhancements have been made to the software and hardware that are used for streaming content to end users in an effort to improve the user experience.

Some software enhancements include improved codecs for encoding the streaming content. Specifically, these codes can reduce the network bandwidth required to stream content or reduce the processing power required to render the content with minimal impact to the content quality. Other software enhancements provide adaptive content streaming. Adaptive content streaming improves the user experience by adjusting the content stream in real-time based on network connectivity (e.g., bandwidth) and rendering performance. Specifically, the bitrate encoding for the content stream can be increased or decreased based on available or changing connectivity and resources. Microsoft's® Smooth Streaming is an Internet Information Services (IIS) Media Services extension that enables such adaptive streaming of content. To provide adaptive content streaming, the content provider encodes the streaming content at multiple quality levels using one or more different codecs. The encoded content is fragmented into chunks of particular durations (e.g., two seconds). When an end user requests the content, the content is passed in chunks with increasing quality levels in order to determine the highest quality that can be sent to the end user within an acceptable level of performance (e.g., network performance or rendering performance). As conditions changes (e.g., network bandwidth decreases or increases or less processor cycles are available), the quality of the stream is adapted to the changing conditions in order to provide an uninterrupted continuous stream.

Improvements to the user experience can also be made by enhancing the hardware that streams content to the end users. One such example is the use of content delivery networks (CDNs) to stream content to the end users. CDNs have improved the user experience by providing decentralized and localized hardware from which to stream content to the end users. In so doing, content is streamed with less latency and less jitter to the end users as the content is streamed from geographically closer locations than when streaming the content from servers of a content provider. Moreover, the CDN provides an infrastructure with sufficient resources to stream the content to a large number of end users. Streaming to such a large number of end users would not be possible with the content provider's own infrastructure because the content provider's own infrastructure often does not include sufficient resources to perform such streaming.

To leverage resources of a CDN, content providers publish their content streams to an ingest server of the CDN. The ingest server makes the streaming content available to a distributed set of edge servers that are geographically positioned at high traffic locations of the data network. An end user requests streaming content from an edge server that is geographically closest to the end user or from an edge server that otherwise optimally distributes content to the end user. Based on the end user request, the edge server contacts, receives, and passes a desired content stream from the ingest server to the end user. In this manner, the end user requests are distributed over multiple edge servers such that no single server (e.g., ingest server or content provider server) is overwhelmed with end user requests. Moreover, the edge servers cache the streaming content to redistribute to end users that subsequently request the same content from the same edge servers. In this manner, no single server is overwhelmed with streaming content to all requesting end users.

While the CDN provides various improvements in the user experience, there is a need to further enhance the CDN. Current CDNs are susceptible to scalability issues and lack appropriate redundancy to ensure a continuous user experience in the presence of network or server failure. With regards to scalability, when one or more content providers publish too many streams to a single ingest server, the performance of the entire CDN is degraded which can cause interruption when streaming content to the end users. With regards to redundancy, when an ingest server or a network link to the ingest server fails, all content streams published to that ingest server may temporarily become unavailable.

Therefore, there is need to provide scalability within a content streaming system, such as a CDN, so that the content streaming system is able to distribute any number of content streams from any number of content providers without creating bottlenecks within the content streaming system. There is further a need to provide redundancy and failover within the content streaming system such that a network failure or server failure does not interrupt content that is streamed from the content streaming system to the end users.

SUMMARY OF THE INVENTION

Some embodiments provide methods and systems for improving the scalability and redundancy of a distributed content streaming system that streams content to multiple end users. In some embodiments, the scaling and redundancy is performed without modifying the Uniform Resource Locators (URLs) or Internet Protocol (IP) addresses used by content providers to publish content to the content streaming system. In some embodiments, the scaling and redundancy is performed without modifying the configurations of existing servers of the content streaming system. Accordingly, the content streaming system of some embodiments provides a zero configuration architecture for scaling the system and providing redundancy for failover.

In some embodiments, the content streaming system includes multiple ingest servers and a distributed set of edge servers. Content providers publish content streams to the ingest servers and the ingest servers make the streams available to the edge servers. In some embodiments, the content streaming system is enhanced with a load balancer and content providers gain access to the ingest servers through a virtual IP address, a load balanced IP address, or a URL that is associated with the load balancer. The load balancer distributes the content streams supplied by the content providers across one or more ingest servers. In this manner, the content streaming system can scale the number of ingest servers without modifying the URLs or IP addresses used by the content providers when publishing content streams to the content streaming system.

Each ingest server sends one or more messages to the edge servers to identify which content streams are available for streaming at which ingest server. The ingest servers identify which edge servers to send the messages to by obtaining addressing information of the edge servers. In some embodiments, each ingest server is preconfigured with the Internet Protocol (IP) addresses of each of the edge servers. In some other embodiments, each ingest server is preconfigured to obtain the IP addresses from a configuration file that is hosted at a centrally managed site of the content streaming system. In still some other embodiments, the edge servers register with the ingest servers in order to provide their IP addresses to the ingest servers. In this manner, a newly added ingest server can be assimilated into the content streaming system without modifying configurations of the existing servers of the system.

In some embodiments, the edge servers include a memory for caching streaming content. In so doing, the edge servers reduce backbone traffic, scale the ingest servers without requiring new ingest servers to be added, and improve the user experience as content is streamed to the end users with less latency. To further improve the scalability of the content streaming system, the edge servers of some embodiments are distributed in a multiple tier configuration. In the multiple tier configuration, a first tier of edge servers provides caching and streams content from the ingest servers to a second tier of edge servers. The second tier of edge servers also provides caching and streams content from the second tier of edge servers to content consumers. With the added layer of caching afforded by the multiple tier configuration, the loads and number of requests processed by the ingest servers is further reduced thereby allowing the ingest servers to support a greater number of content streams.

In some embodiments, the content streaming system provides zero configuration failover that occurs without interrupting the user experience. In some such embodiments, the load balancer distributes content streams of the content providers across the ingest servers. The load balancers monitor the ingest servers to detect a failure. When a failure is detected at a first ingest server, the content streams that have been distributed to the first ingest server are redistributed to one or more second operational ingest servers. The content providers publish content streams to the second ingest servers which causes the second ingest servers to automatically send the messages to notify the edge servers of the redistribution of the content streams. The edge servers identify that the content streams have been redistributed to different ingest servers based on the messages. This causes the edge servers to failover and request the content streams from the second ingest servers. With buffering at the edge servers, such failover occurs with zero configuration and with no interruption to the end user experience.

BRIEF DESCRIPTION OF THE DRAWINGS

In order to achieve a better understanding of the nature of the present invention, a preferred embodiment of the content streaming system will now be described, by way of example only, with reference to the accompanying drawings in which.

DETAILED DESCRIPTION

In the following detailed description, numerous details, examples, and embodiments of a content streaming system are set forth and described. It will be clear and apparent to one skilled in the art that the content streaming system is not limited to the embodiments set forth and that the content streaming system may be practiced without some of the specific details and examples discussed.

I. Content Streaming System

Some embodiments provide methods and systems for improving the scalability and redundancy of a distributed content streaming system that streams content to multiple end users. In some embodiments, the content streaming system is a content delivery network (CDN), "cloud" service provider, or other provider of streaming content. The figures and description provided hereafter are presented relative to a CDN. However, it should be apparent to one of ordinary skill that these embodiments are applicable to any provider of streaming content.

Figure 1:
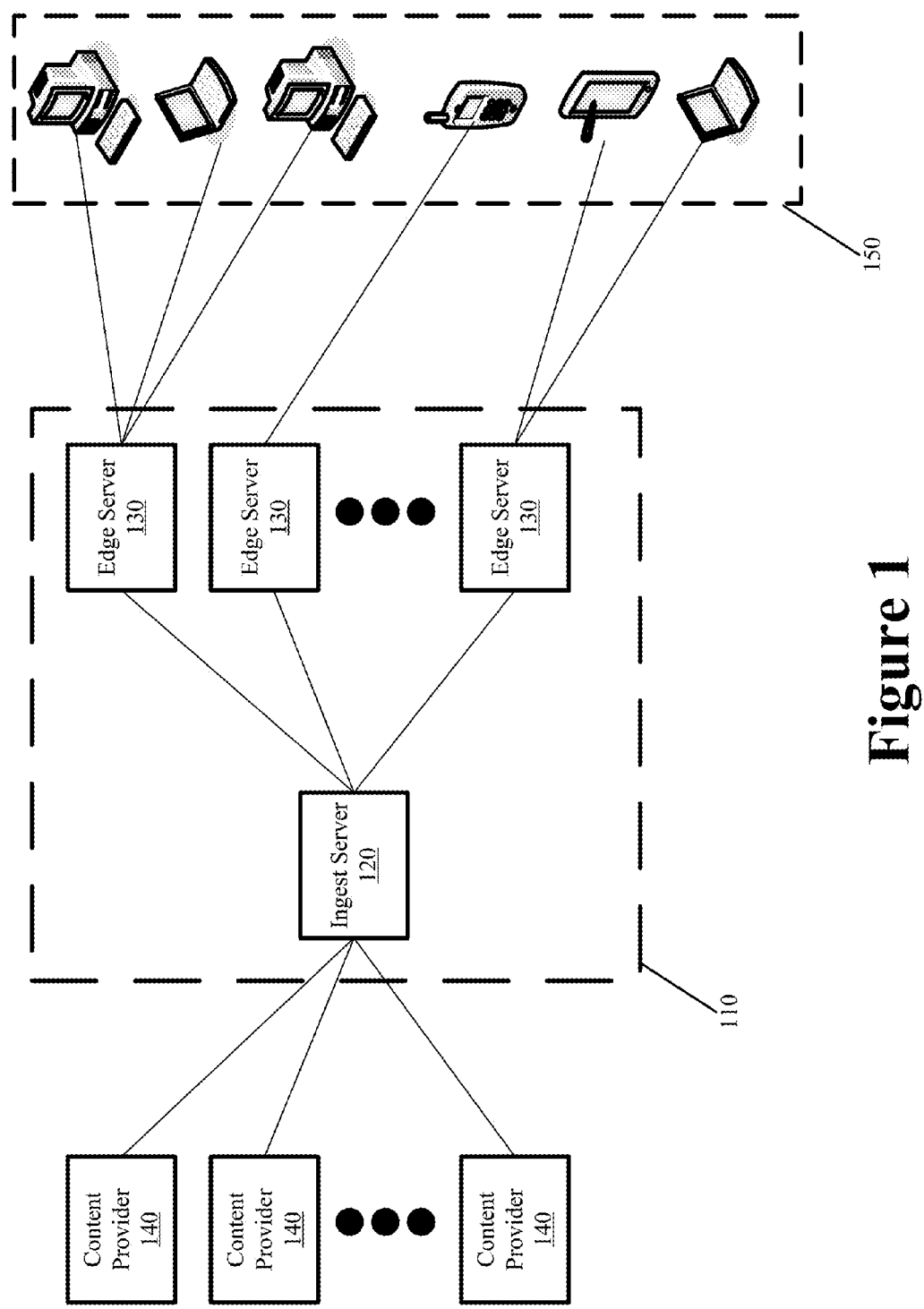
FIG. 1 illustrates a content streaming system architecture that enables scalability and redundancy in accordance with some embodiments.

FIG. 1 illustrates a content streaming system 110 architecture that enables scalability and redundancy in accordance with some embodiments. The content streaming system 110 includes an ingest server 120 and multiple edge servers 130 that together stream content from various content providers 140 to multiple end users 150.

The content providers 140 publish one instance of their content streams to the ingest server 120 and the content providers 140 rely on the infrastructure of the content streaming system 110 to stream the content to a large number of end users. The content streaming system 110 hierarchically distributes the content streams so that no single server (e.g., ingest server or edge server) is streaming content to all end users 150. Specifically, the ingest server 120 streams the content on behalf of the content providers 140 to the edge servers 130. Each edge server then streams the content to a set of end users. In some embodiments, each edge server is geographically located near a particular set of end users so that the content is streamed with less latency and less jitter from the edge server to the particular set of end users than when streaming the content from a remote server (e.g., the content provider's streaming server) to the particular set of end users.

As used herein, a server includes (i) an independent physical computing machine or device of the content streaming system 110 with a processor, memory, storage, and network connectivity and (ii) a virtual machine that runs in conjunction with other virtual machines on a single or distributed set of physical computing machines or devices, wherein each virtual machine is provided exclusive or shared access to a particular set of computing resources (e.g., processor, memory, storage, etc.) of the physical computing machines or devices.

Figure 2:
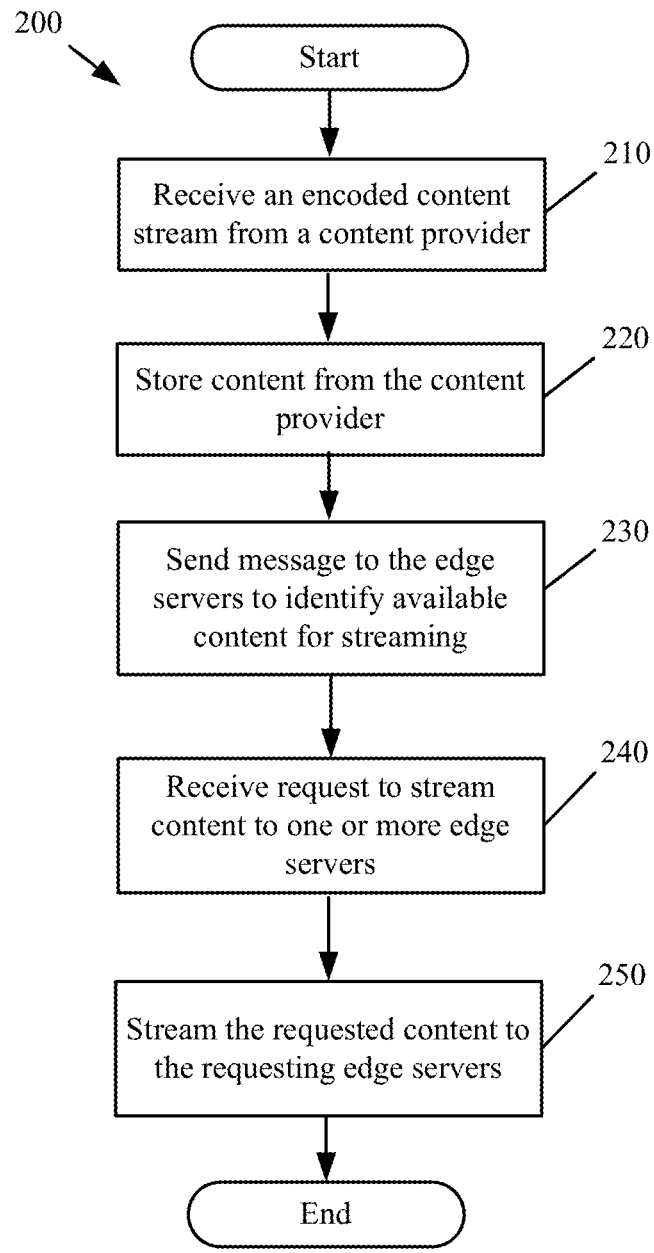
FIG. 2 presents a process performed by the ingest server for streaming content within the content streaming system in a manner that enables the scalability and redundancy of the content streaming system in accordance with some embodiments.
Figure 3:
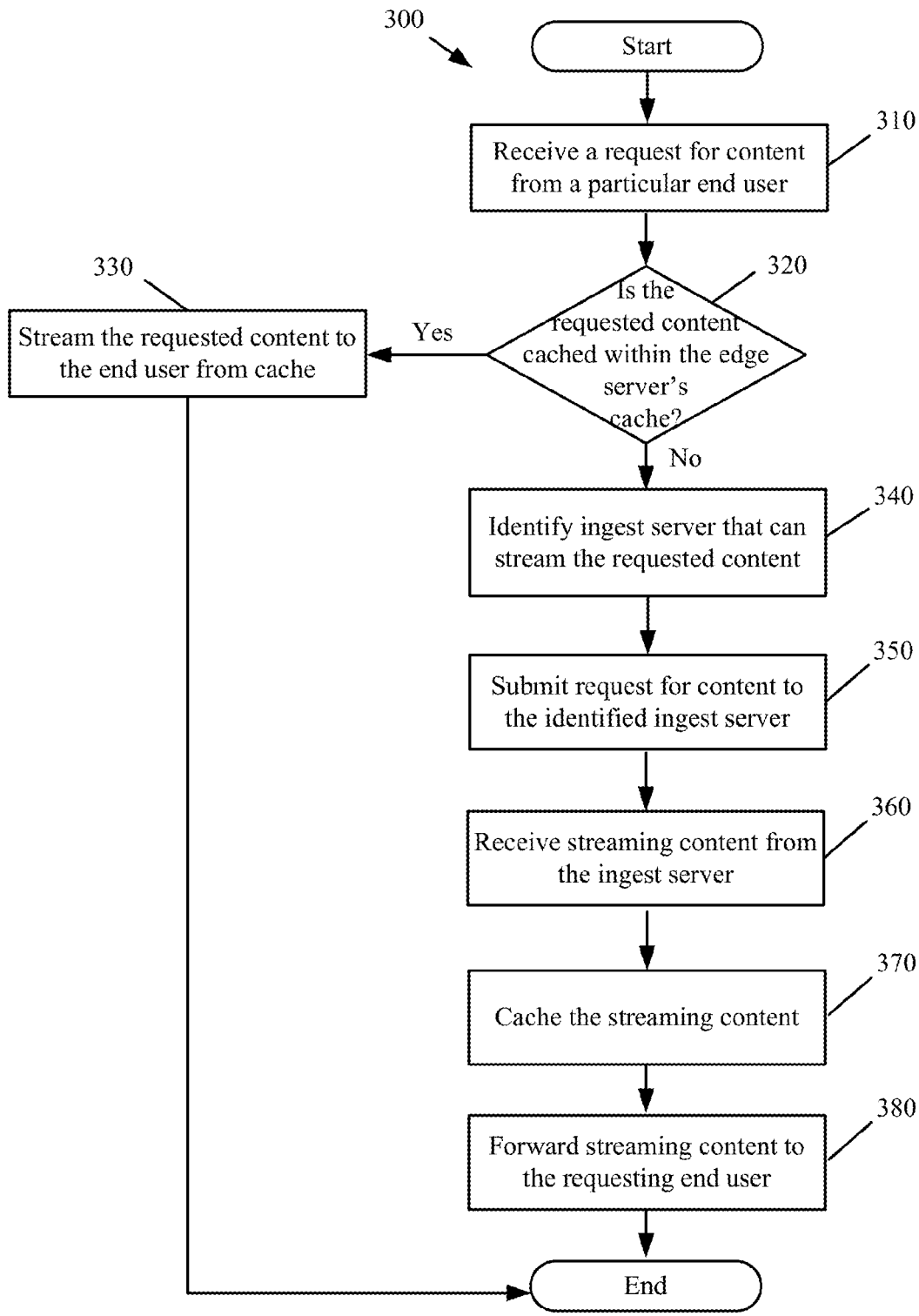
FIG. 3 presents a process performed by an edge server of the content streaming system to stream content to a particular end user in a manner that enables the scalability and redundancy of the content streaming system in accordance with some embodiments.

FIGS. 2 and 3 below present processes performed by the ingest server 120 and the multiple edge servers 130 to stream content to the end users 150 in a manner that enables the scalability and redundancy of the content streaming system 110. Section II below describes scaling and redundancy of the content streaming system 110 in accordance with some embodiments.

A. Ingest Server

FIG. 2 presents a process 200 performed by the ingest server 120 for streaming content within the content streaming system 110 in a manner that enables the scalability and redundancy of the content streaming system 110 in accordance with some embodiments. The process 200 begins by receiving (at 210) a content stream that a content provider wishes to publish to the ingest server. The content stream may be encoded using any one of several encoding codecs. For example, the content stream may be encoded using H.264 or Moving Picture Experts Group (MPEG) encoding when the content includes video.

The content provider publishes the content stream to the ingest server using a streaming server such as Adobe® Flash media streaming server, Apple® Quicktime streaming server, Darwin streaming server, or other such streaming server. The content provider streaming server uploads or streams the content to the ingest server using a specific Uniform Resource Locator (URL) that is associated with the ingest server. In some embodiments, the URL includes various parameters that may authenticate the content provider, authorize the content provider, and/or provide parameters that are related to the content stream being uploaded. For example, the URL "http://is1.hostingsystem.net/21001/StreamNameET1234.isml" identifies which ingest server to publish a content stream to (i.e., is1.hostingsystem.net), the content provider's account number (i.e., 21001), the encoded stream name (i.e., StreamName.isml), and authentication information (i.e., ET1234). The authentication information may include any number of characters or numbers that may be set by the content provider.

The authentication information is setup when the content provider registers with the content streaming system. In addition to or instead of the authentication information, the content streaming system may provide the content provider with a token during registration. The content provider passes the token to authenticate the content provider when publishing content to the content streaming system. In some embodiments, the token includes an encrypted file that specifies authentication and/or authorization parameters for allowing a content provider to publish content streams to the content streaming system. Once a content provider is registered, the content streaming system configures the ingest servers with (i) the authentication information of the content provider or (ii) verification parameters to verify the content provider's token.

Also, as part of registration, the content provider is provided a URL that is used to publish a content stream to the ingest server. In some embodiments, other publishing parameters (e.g., duration, server side archiving, etc.) may be provided within the URL. Alternatively, these publication parameters may be preconfigured on the ingest servers. Some embodiments provide the content providers with other addressing information in addition to or instead of the URL. This addressing information may include an Internet Protocol (IP) address that is used to publish content to a particular ingest server. For example "http://xxx.xxx.xxx.xxx/21001/StreamNameET1234.isml" identifies which ingest server to publish a content stream to using the IP address xxx.xxx.xxx.xxx and other parameters operate as specified above.

In some embodiments, the content providers publish different encodings of the same content at different quality settings (e.g., different compression levels) to the ingest server. The content providers optionally provide a manifest file to identify the different encodings and to facilitate adaptive streaming of the different encodings.

Continuing with the process 200, the process stores (at 220) the streamed or uploaded content from the content provider to a memory of the ingest server. The memory may include volatile memory such as Random Access Memory (RAM) or non-volatile memory such as magnetic storage, optical storage, or other forms of computer readable storage medium.

The process makes the content stream available to the edge servers by sending (at 230) one or more messages to the edge servers. The messages identify which content is currently being streamed to or is available for streaming at the ingest server. The messages may include the IP address or hostname of the ingest server and one or more content stream names that are being streamed to or are available for streaming at the ingest server. In some embodiments, the messages are sent once a content provider begins publishing a content stream to the ingest server. The messages may also be periodically sent (e.g., every minute) to update the edge servers of the available streaming content. In some embodiments, the messages may include unicast, multicast, or broadcast messages.

To identify which edge servers receive the messages, the ingest server maintains in its configuration the IP address of each edge server of the content streaming system. To obtain the edge server IP addresses, the ingest server may be preconfigured with an IP address of a centrally managed site of the content streaming system. This site hosts a configuration file that specifies the IP addresses of all operational edge servers. The ingest server downloads the configuration file periodically or when it is brought online in order to obtain the edge server IP addresses. In some embodiments, the edge servers periodically register with the centrally managed site to keep the configuration file up to date. The same configuration file can be downloaded and used by multiple ingest servers of the content streaming system such that a change to any IP address in the configuration file can automatically propagate to all ingest servers.

Alternatively, the ingest server may be preconfigured with the IP addresses of the edge servers. In some other embodiments, the edge servers perform a registration procedure directly with the ingest server in order to provide their IP addresses to the ingest server. In some such embodiments, each edge server is configured with the IP addresses of one or more ingest servers. At particular intervals or during startup, each edge server registers with each ingest server in the preconfigured list of ingest servers. Alternatively, the edge servers may be configured to obtain the ingest server IP address(es) from a configuration file that is hosted at a centrally managed site of the content streaming system.

When the ingest server performing the process 200 receives (at 240) a request to stream content to one or more edge servers, the process locates and streams (at 250) the requested content from memory to the requesting edge servers. In some embodiments, the content stream request specifies a particular stream name that was identified from the messages sent at 230, a particular interval of content, a particular content bitrate or encoding, or other parameters. The streamed content can be dynamically adjusted to provide a higher or lower bitrate as conditions change when streaming the content.

B. Edge Servers

The edge servers 130 of FIG. 1 facilitate the transfer of streaming content from one or more ingest servers to the end users. The edge servers may include streaming servers, web servers, database servers, advertisement servers, or other servers of a CDN. As will be further described below, each edge server utilizes memory to cache content that is streamed to at least one end user.

The edge servers are geographically positioned across the Internet or other data networks. In some embodiments, the edge servers are located at high traffic locations (e.g., primary Internet exchange points) within the Internet or other data networks. The distributed edge servers create various points-of-presence (POPs) within a network. One or more edge servers may be located at a POP and may be used to stream content to end users that are associated with that POP. A POP may encompass one or more municipalities, cities, states, countries, or areas.

FIG. 3 presents a process 300 performed by an edge server of the content streaming system to stream content to a particular end user in a manner that enables the scalability and redundancy of the content streaming system in accordance with some embodiments. The process 300 assumes that the messages that are sent from the ingest server have been received at the edge server. The process 300 begins when the edge server receives (at 310) a request for a content stream from the particular end user. In some embodiments, the request includes a Hypertext Transfer Protocol (HTTP) message or other content request formatted message such as a File Transfer Protocol (FTP) formatted message. The request may be issued when the end user invokes a hyperlink that is associated with a content stream and the hyperlink directs the end user to the edge server. In some embodiments, the request specifies a particular content stream name or value for identifying the content stream.

Upon receiving the content stream request, the process determines (at 320) whether the requested content stream is cached within the edge server's memory. Such content may be cached when another end user has previously requested the same content. When another end user has previously requested the same content, the edge server will have previously (i) requested the content stream from the appropriate ingest server, (ii) received an instance of the content stream from the ingest server, and (iii) streamed the received content to the requesting end user while also caching the content stream in memory. Accordingly, when the requested streaming content is cached at the edge server, the process streams (at 330) the requested content to the end user from the edge server's memory (i.e., cache). In this manner, an edge server at a particular POP receives one instance of a particular content stream from the ingest server. The particular content stream can then be distributed to different end users within the POP that request the content stream from the edge server at different times without having to stream the same content again from the ingest server. This reduces the load on the ingest server while also minimizing inter-POP traffic thereby reducing network costs as less traffic is passed over the backbone network.

When the requested streaming content is not cached in the edge server's memory, the process identifies (at 340) the appropriate ingest server that has the requested content stream available for streaming. The appropriate ingest server is identified based on the messages that one or more ingest servers send to the edge servers in order to identify which streams are available for streaming at which ingest server. The process submits (at 350) a request for the content stream to the identified ingest server. In response to the edge server request, the ingest server begins streaming content to the edge server. The process receives (at 360) the streaming content from the ingest server. The process caches (at 370) the streaming content in memory so that subsequent requests for the same content can be fulfilled without having to again request and stream the content from the ingest server. Next, the process forwards (at 380) the content to the requesting end user. In some embodiments, the edge server performs buffering prior to streaming the content to the requesting end user.

II. Scaling and Redundancy

A. Enhanced Content Streaming System Architecture

As noted above, the content streaming system of FIG. 1 provides a scalable architecture that can scale to support any number of active content streams from any number of content providers. Additionally, the content streaming system of FIG. 1 provides a redundant architecture that can provide automatic failover in the event of server or network failure. In some embodiments, the scaling and redundancy is performed without modifying the URLs or IP addresses used by content providers to publish content to the ingest servers. In some embodiments, the scaling and redundancy is performed without modifying the configurations of existing servers of the content streaming system. Accordingly, the content streaming system of some embodiments provides a zero configuration architecture for scaling the system and providing redundancy for failover.

Figure 4:
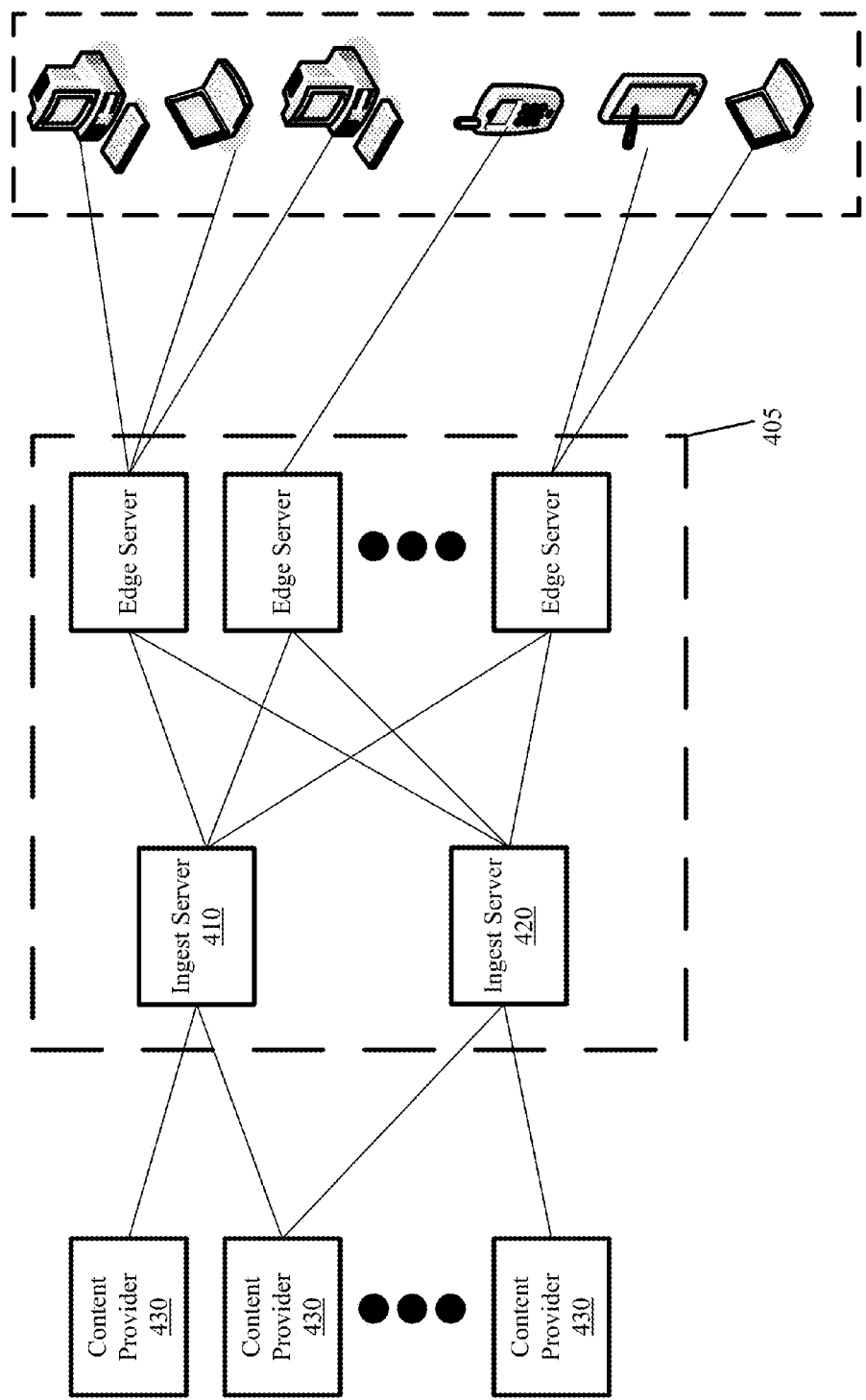
FIG. 4 illustrates the content streaming system architecture enhanced to include multiple ingest servers in accordance with some embodiments.

In some embodiments, the content streaming system is scaled by adding ingest servers to or removing ingest servers from an existing architecture. Each additional ingest server can support multiple content streams from one or more content providers or can be used to offload one or more content streams from existing ingest servers in order to reduce the loads on the other ingest servers. FIG. 4 illustrates the content streaming system 405 architecture enhanced to include multiple ingest servers 410 and 420 in accordance with some embodiments. Each of the ingest servers 410 or 420 may be located at the same or different geographic locations (e.g., the same or different POPs). It should be apparent to one of ordinary skill in the art that the enhanced content streaming system 405 of FIG. 4 may include additional ingest servers when needed.

In some embodiments, the content providers 430 manually specify which ingest server 410 or 420 of the content streaming system 405 to publish their content streams to using different URLs. For example, a content provider specifies the URL "is1.hostingsystem.com" to publish one or more content streams to a first ingest server 410 and specifies the URL "is2.hostingsystem.com" to publish one or more content streams to a second ingest server 420 of the enhanced content streaming system 405.

Figure 5:
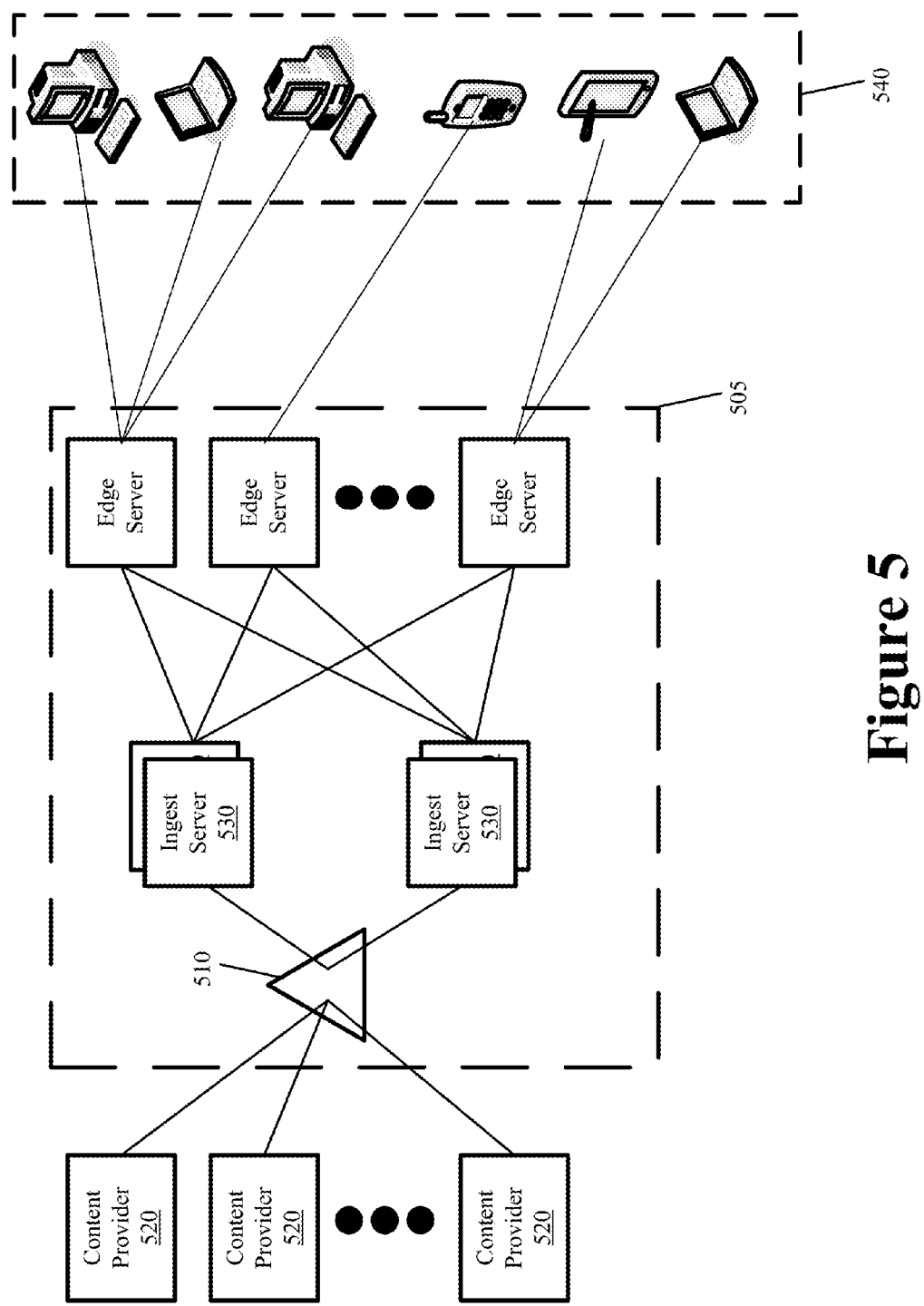
FIG. 5 illustrates an enhanced content streaming system architecture for automatically provisioning streaming content to multiple ingest servers in accordance with some embodiments.

However, the enhanced content streaming system 405 requires each content provider to be provided with the URL or IP address of each ingest server that is added to the system so that the content provider can publish content to the newly added ingest server. This adds complexity and configuration overhead to the content streaming system. To simplify the scaling of the content streaming system and eliminate the configuration changes that the content providers make or the configuration changes that are passed to the content providers, some embodiments scale the system (e.g., add ingest servers) while providing content providers with one or more static URLs or IP addresses to which content providers can publish their content streams to. In some such embodiments, the content streaming system automatically distributes the content streams from the static URLs or IP addresses to specific URLs or IP addresses of different ingest servers. FIG. 5 illustrates an enhanced content streaming system architecture 505 for automatically provisioning streaming content to multiple ingest servers in accordance with some embodiments. As shown, the content streaming system architecture 505 is modified to include load balancer 510. It should be apparent to one of ordinary skill in the art that the architecture 505 may be modified to include two or more load balancers.

In this architecture 505, content providers 520 specify a load balanced IP address or a URL that resolves to a load balanced IP address when publishing streaming content to the content streaming system 505. In some embodiments, the load balanced IP address is a Virtual IP address (VIP) used to contact the load balancer 510. The load balancer 510 distributes the content provider 520 across a set of ingest servers 530. Specifically, the load balancer 510 forwards each content provider to a particular ingest server that is selected from a set of ingest servers 530. The content providers 520 are unaware of the forwarding and publish their content stream to the selected ingest server.

In some embodiments, the load balancer 510 selects an ingest server from the set of ingest servers 530 based on one or more of a source hash, identifying a least weighted ingest server, identifying an ingest server with the fewest number of connections, identifying the least busy ingest server, and round robin distribution. It should be apparent that the selection may be based on other criteria in addition to or instead of the above enumerated criteria. Different load balancers may utilize different criteria when selecting which ingest server from the set of ingest servers 530 to forward a content provider to.

In some embodiments, the load balancer 510 is preconfigured with the IP addresses of the multiple ingest servers 530. In some other embodiments, the ingest servers 530 identify themselves to the load balancer 510 when the ingest servers 530 are brought online.

B. Advantages
i. Zero Configuration Scaling

The enhanced content streaming systems of FIGS. 4 and 5 provide architectures that scale to stream any number of content streams from any number of content providers. Moreover in FIG. 5, the scaling is performed without modifying the URLs or IP addresses that are used by the content providers to publish their content to the content streaming system. Accordingly, when an ingest server is added to the content streaming system, the content providers can leverage the functionality provided by the added server without any configuration changes on the part of the content providers. The content providers continue to stream content to the load balanced IP address or URL. The load balancer then distributes the content streams over the ingest servers in a manner that optimizes the resources of the ingest servers.

Internally, a content streaming system administrator may manually update the configuration of the load balancer to include the IP address of the newly added ingest server. In some embodiments, the functionality of the newly added ingest server is assimilated to the content streaming system without manually modifying configurations of existing servers such as the load balancer. In some such embodiments, a newly added ingest server is configured with the IP addresses of one or more load balancers of the content streaming system. When brought online or at specified time periods, the ingest server contacts the load balancers and notifies them of its availability by registering with the load balancers or providing the load balancers with the ingest server's IP address. Once notified, the load balancers can distribute content streams to the newly added ingest server when performing load balancing. In this manner, the existing components can assimilate functionality of newly added components without manual configuration changes to existing servers.

Similarly, the scaling of the content streaming system does not affect the configurations used by end users to obtain streaming content from the system. Specifically, the content streaming system can be scaled without modifying the URLs used by the end users to access various content streams from the content streaming system. When an end user submits a content stream request (e.g., http://www.streamingsystem.com/streamAB.isml), DNS name servers resolve the request and provide the end user with an IP address of an edge server. Preferably, the request is resolved to identify an edge server that optimally distributes content to the end user. The end user forwards the content request to the identified edge server where the content request contains at least one of the name of the content stream or a unique identifier that identifies the content stream. Irrespective of which edge server receives the request, the edge server that receives the request identifies whether the requested content is already cached in memory. If not, the edge server identifies which ingest server has the requested stream based on the messages that are received from the ingest servers. As noted above, a newly added ingest server sends messages that identify available content streams to the edge servers as soon as one content stream is published to the ingest server. The edge server requests the content stream from the identified ingest server and passes the content stream to the end user.

The scaling of the ingest servers can also be performed without modifying the configurations of existing content streaming system components such as the existing ingest servers and existing edge servers. Such zero configuration scaling is enabled by the autonomous processes performed by each of the ingest servers and edge servers (see processes 200 of FIG. 2 and 300 of FIG. 3).

For instance, when an ingest server is added to the content streaming system, the newly added ingest server automatically sends to the edge servers the messages that identify which content streams are available at the ingest server for streaming. As noted in FIG. 2, the ingest server can be configured to obtain the IP addresses of the edge servers from a centrally managed site of the content streaming system. Alternatively, the newly added ingest server can be preconfigured with the IP addresses of the edge servers. In any case, no configuration modifications are made to existing servers (e.g., ingest servers or edge servers) of the content streaming system to assimilate the functionality provided by the newly added ingest server. Accordingly, adding or removing an ingest server does not impact other servers of the content streaming system While the above discussion pertains to zero configuration scaling of ingest servers, it should be apparent to one of ordinary skill in the art that the edge servers of the content streaming system can similarly be scaled with zero configuration. For example, a newly added edge server can be configured with the IP address of the centrally managed site. When brought online, the newly added edge server can register with the site to provide its IP address and thereby update the configuration file that contains the IP addresses of all operational edge servers that is used by the ingest servers when generating the content stream identification messages. In some embodiments, the newly added edge server is preconfigured with the IP addresses of the ingest servers such that the edge server performs a registration procedure with each of the ingest servers in order to provide its IP address directly to the ingest servers. In either case, the ingest servers obtain the IP address of the newly added edge server without manual configuration changes to the ingest servers. The ingest servers can then broadcast the content stream identification messages to the newly added edge server and thereby assimilate the newly added edge server functionality within the content streaming system.

ii. Zero Configuration Failover

In some embodiments, the enhanced content streaming system improves the user experience by providing zero configuration failover that occurs without interrupting the user experience. Specifically, the content provider does not need to modify its configuration for publishing a content stream to the content streaming system when an ingest server or network link to an ingest server to which content is being published fails. Failure at a network link or failure at an ingest server is an isolated failure that does not impact the overall content streaming system operation. When such failure is detected, the load balancer redistributes the content streams of the content providers affected by the failure to an operational network link or to a failover ingest server. With buffering at the edge servers, such redistribution can occur seamlessly without the end user who receives one or more of the affected content streams becoming aware of the failure and without interruption to the end user's experience. As a result, end users do not modify their configurations to receive a particular content stream when an ingest server or network link from which that particular content stream is being streamed to the end user fails.

Figure 6:
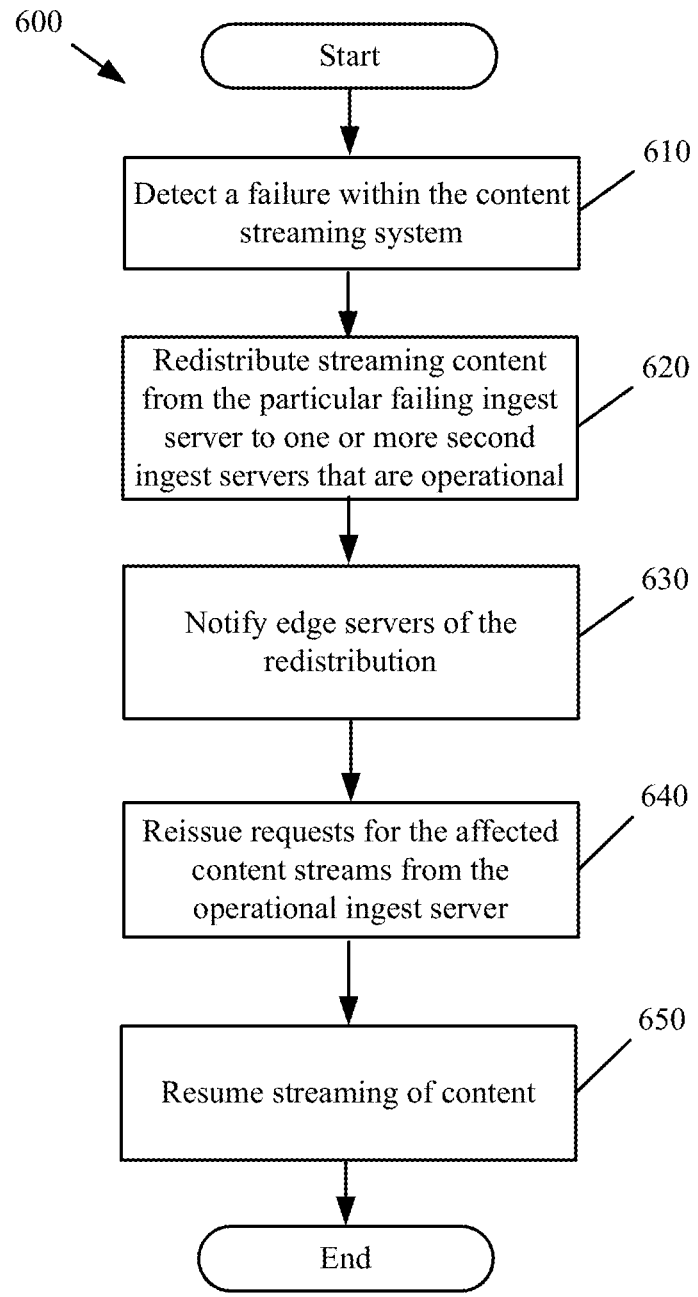
FIG. 6 presents a process for performing failover within the content streaming system in accordance with some embodiments.

FIG. 6 presents a process 600 for performing failover within the content streaming system in accordance with some embodiments. The process 600 begins when a failure is detected (at 610) within the content streaming system. The failure may include a particular ingest server failure whereby the particular ingest server becomes unavailable due to software failure or hardware failure. The failure may also include a network failure whereby a network link to an ingest server fails (e.g., a router failure). Such failures may be detected by any of the load balancers or edge servers of the content streaming system.

In some embodiments, a failure is detected by sending Internet Control Message Protocol (ICMP) echo request packets from one server of the content streaming system to another. The ICMP packets ping a destination server to determine that the network link to the destination server is operational and that the destination server is operational. For example, a load balancer sends ICMP packets to each of the ingest servers that it distributes traffic across. When a response from a particular ingest server is not received or the response contains abnormal parameters (e.g., excessive latency), the load balancer can determine that a failure has occurred in the network link to that particular ingest server or the particular ingest server has failed. The load balancer stops all distribution to that ingest server until the ping replies no longer identify any failures.

In FIG. 6, it is assumed that a particular ingest server or network link to the particular ingest server has failed. Therefore, upon detection of the failure, the process redistributes (at 620) the streaming content from the particular failing ingest server to a second ingest server that is operational. In some embodiments, the load balancers redistribute the content providers from the particular failing ingest server to two or more second operational ingest servers.

The process notifies (at 630) the edge servers of the redistribution. Such notification occurs in conjunction with the redistribution of the content streams. Specifically, the second ingest server(s), that now receives the redistributed content streams from the failing ingest server, generates messages that identify to the edge servers which content streams have been forwarded to it.

The edge servers that were impacted by the failure, identify that the affected content streams have been redistributed to the second ingest server. Accordingly, as part of the failover process, the edge servers reissue requests (at 640) for the affected content streams to the second ingest server instead of the failing ingest server. The edge servers can request the exact portion of the content at which the stream was cut-off or affected by the failure. The process then completes the failover by resuming (at 650) the streaming of content from the second ingest server(s) to the edge servers. In this manner, the content streaming system performs failover with zero configuration on the part of the content providers, end users, or servers of the content streaming system.

In some embodiments, the streams to the end users are uninterrupted as each of the edge servers retains a buffer. Prior to streaming content to the end users, each edge server buffers a certain duration of content. The edge servers update the buffer as content is streamed to the end users. When a failure occurs and the streaming of content to the edge servers is impacted, the edge servers can continue streaming content to the end users from their buffer as they failover to the second operational ingest server as described with reference to steps 630, 640, and 650 above. In some embodiments, the buffers store 5-30 seconds worth of content and failover may occur within a few seconds or milliseconds of detecting a failure.

In some embodiments, the edge servers do not wait for the messages to arrive from the ingest servers before failing over from one ingest server to another. In some such embodiments, content providers may have published the same content stream to multiple ingest servers or the load balancers may have distributed a particular content stream to multiple ingest servers to provide redundancy. Accordingly, from the messages that are sent from the ingest servers, the edge servers identify that the same content stream is available at two or more ingest servers. When a failure occurs, the edge servers that are impacted by the failure perform a lookup within their configuration to determine a redundant ingest server that streams the same content. If one is available, the edge server automatically performs the failover to the redundant server.

In some embodiments, the edge servers utilize a weighting algorithm to determine which ingest server from a set of ingest servers to obtain a redundant content stream from. In some embodiments, the weighting algorithm identifies the ingest server that optimally streams content to the edge user based on one or more performance metrics (e.g., cost, latency, jitter, proximity, time of day, network congestion, etc.). When two ingest servers are equally weighted, an edge server may obtain a content stream from the ingest server that most recently sent a content stream identification message.

iii. Redundancy

In some embodiments, the enhanced content streaming system redundantly publishes content to facilitate the above described failover. Such redundancy may be automatically provided whereby the load balancers of the content streaming system automatically distribute a content stream to at least two ingest servers for publishing. In some embodiments, content providers specify the number of ingest servers to publish content to using a parameter within the URL that is used to publish content to the content streaming system.

Redundancy can also be used to distribute loads over multiple ingest servers. Such distribution is useful for highly desired content such as a live stream of the Superbowl. By distributing the content stream over multiple ingest servers, no single ingest server is responsible for streaming the content to the edge servers. This reduces the possibility that any single ingest server can become overwhelmed with streaming content thereby degrading the user experience.

Such distribution can also be performed for content providers that publish numerous active content streams. For example, a single content provider that operates hundreds of webcams may have content streaming from each such webcam. Rather, than publish all such content streams to a single ingest server, the load balancers can evenly distribute the loads across multiple ingest servers. It should be apparent to one of ordinary skill in the art that content providers may selectively specify which ingest servers to publish content to using specific URLs of the ingest servers.

iv. Caching

The enhanced content streaming system of some embodiments also improves the user experience by optimizing the distribution of the streaming content to the end user. The streaming content may be cached at the edge servers that are geographically closer to the end user than the ingest servers or servers of the content provider. In this manner, the streaming content arrives at the end user with lower latency and less jitter. Backbone traffic is also reduced as the content provider server or ingest server no longer performs the content streaming to all requesting end users. Rather, the streaming content is hierarchically distributed such that the majority of the streaming traffic is localized to intra-POP traffic where end users that are associated with a particular POP receive the streaming content from an edge server that is located at that POP.

In this manner, network costs for the content provider are reduced as the content provider streams the content to one or more ingest servers instead of all requesting end users. Additionally, the network costs to the content streaming system are reduced as the ingest servers stream one instance of a particular content stream to the edge servers that then cache the streamed content. The edge servers stream the content to the end users that are local to the edge servers whenever an end user submits a request for that particular content stream without having to again stream the content from the ingest server to the edge servers.

C. Other Content Streaming System Enhancements

Figure 7:
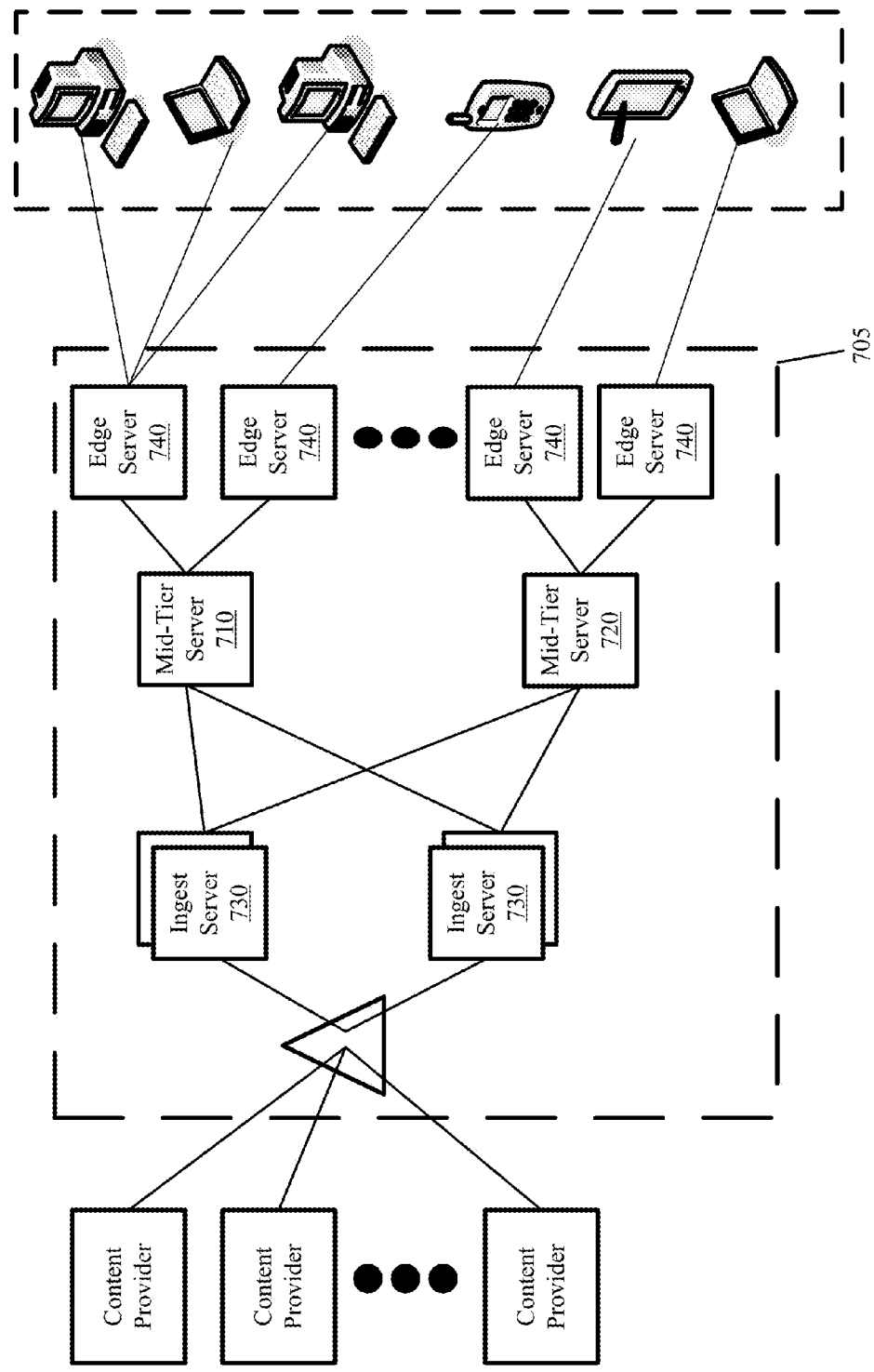
FIG. 7 illustrates an enhanced content streaming system architecture with mid-tier servers in accordance with some embodiments.

In addition to or instead of scaling the ingest servers, some embodiments include one or more mid-tier servers to scale ingest server and/or edge server functionality. The mid-teir servers operate in between the ingest servers and the edge servers. FIG. 7 illustrates an enhanced content streaming system 705 architecture with mid-tier servers in accordance with some embodiments. As shown, the mid-tier servers 710 and 720 operate between the ingest servers 730 and the edge servers 740. It should be apparent to one of ordinary skill in the art that the content streaming system architecture 705 of FIG. 7 is scalable to include any number of ingest servers, mid-tier servers, and edge servers.

In some embodiments, the mid-tier servers 710 and 720 function as edge servers that stream content from the ingest servers 730 to two or more of the edge servers 740. As with the edge servers, the mid-tier servers 710 and 720 include a memory for caching content that is streamed from the ingest servers 730 to the edge servers 740. The mid-tier servers 710 and 720 thereby introduce an additional caching layer within the content streaming system of some embodiments. This additional caching layer further reduces the loads on the ingest servers 730.

The reduced loads enables the scaling of the ingest server functionality without adding ingest servers to the content streaming system 705. Specifically, the ingest servers 730 stream content to a particular mid-tier server (e.g., 710 or 720) instead of two or more edge servers that the mid-tier server redistributes the content stream to. Consequently, each mid-tier server 710 and 720 proportionally reduces the load on the ingest servers 730 based on the number of edge servers that receive streaming content from the mid-tier server instead of directly from the ingest servers 730.

The mid-tier servers 710 and 720 also reduce the number of content stream requests that are processed by each of the ingest servers 730. Specifically, whenever two or more edge servers that are associated with a particular mid-tier server request a content stream, only one such request is forwarded by the mid-tier server to an appropriate ingest server. From that single request, the particular mid-tier server caches the content stream as it is passed from the appropriate ingest server to the particular mid-tier server. The particular mid-tier server can then satisfy from its cache all subsequent requests for the same content by different edge servers that are associated with the particular mid-tier server. In so doing, the subsequent requests are not forwarded to the ingest server thereby freeing resources of the ingest server.

The caching provided by the mid-tier servers 710 and 720 reduces inter-POP traffic. For instance, a mid-tier server 710 or 720 is located within a particular POP that includes multiple edge servers. To stream content to all edge servers of the particular POP, an ingest server sends a single inter-POP stream to the mid-tier server at the particular POP. The mid-tier server then redistributes the stream intra-POP to the edge servers of the particular POP and the edge servers can then distribute the stream to end users. Without the mid-tier server, multiple streams for the same content would be streamed from the ingest server to the edge servers of the particular POP. This would result in redundant inter-POP traffic as the same content is sent to the edge servers of the particular POP instead of sending one instance of the content to the mid-tier server and then redistributing it from within the POP using the mid-tier server.

The functionality afforded by the mid-tier servers 710 and 720 may be assimilated to the content streaming system with zero configuration changes to the content providers and end users. In other words, any number of mid-tier servers can be added or removed from the content streaming system and the content providers can continue to use the same URLs or IP addresses when publishing content to the content streaming system. Similarly, the URLs and IP addresses used by end users to request content from the content streaming system do not change irrespective of the addition or removal of mid-tier servers.

The mid-tier servers may be assimilated in various ways. In some embodiments, the ingest servers 730 may be preconfigured with the identification information (e.g., IP addresses) of the mid-tier servers 710 and 720. Alternatively, the mid-tier servers 710 and 720 may be configured to register with the centrally managed site of the system 705 or the ingest servers 730 in order to update the configuration file with the IP address information of the mid-tier servers 710 and 720. Accordingly, when the ingest servers 730 download the configuration file, the ingest servers 730 obtain the IP addresses of the mid-tier servers 710 and 720. Either configuration causes the ingest servers 730 to send the messages that identify the content that is available for streaming to the mid-tier servers 710 and 720 instead of to each of the edge servers 740.

Each edge server may be preconfigured to submit end user streaming content requests to a particular mid-tier server. In some embodiments, each edge server dynamically selects a mid-tier server from a set of mid-tier servers to submit the requests to. In some embodiments, the edge servers perform layer 7 load balancing to distribute content requests over a set of mid-tier servers. In some other embodiments, the edge servers are configured with a hashing function. The hashing function may use the requested content name as a hashing parameter from which to determine which mid-tier server from the set of mid-tier servers to request content from. As a simplified example, an edge server may include a hashing function whereby all requests for content with names that begin with the letters A-J are passed to a first mid-tier server and all requests for content with names that begin with the letters K-Z are passed to a second mid-tier server. Alternatively, the edge servers may utilize a round robin distribution algorithm to alternate sending requests between a set of mid-tier servers. Alternatively, the edge servers may be configured with proximity parameters that statically prioritize which mid-tier servers a particular edge server should request content from. For example, each edge server may be configured to identify which mid-tier server is in the same POP or nearby POP as the edge server. Such proximity parameters may be dynamically updated as the content streaming system operates. In so doing, the configuration is dynamically modified to reprioritize the mid-tier servers based on monitored network and usage parameters.

By requesting content from different mid-tier servers, the content streaming system provides redundancy and failover within the mid-tier servers. A single mid-tier server failure does not impact an edge server's ability to request and obtain streaming content. When a particular mid-tier server becomes unavailable, the edge servers affected by the unavailability failover to one or more different mid-tier servers. Subsequent requests for content streams are sent to the failover mid-tier servers. In so doing, content is streamed from the failover mid-tier servers to the affected edge server. As before, buffering at the edge servers allows for seamless failover whereby the end user experience is unaffected by a failure within a mid-tier server or ingest server of the content streaming system. In some embodiments, the mid-tier servers also perform buffering to further facilitate a seamless failover from one ingest server to another.

Figure 8:
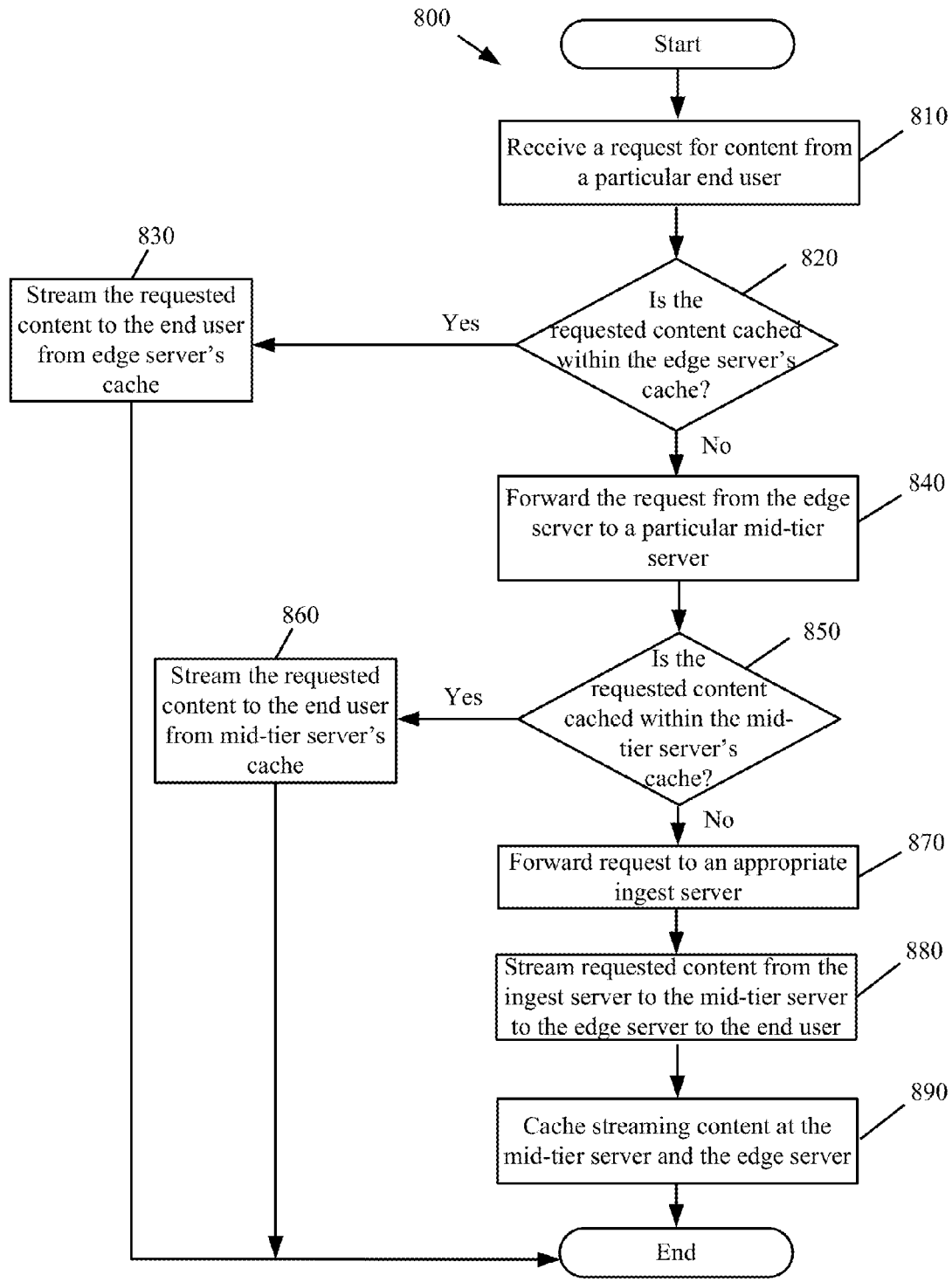
FIG. 8 presents a process to service an end user content request using the enhanced content streaming system architecture of FIG. 7.

FIG. 8 presents a process 800 to service an end user content request using the enhanced content streaming system architecture of FIG. 7. The process 800 begins when an edge server receives (at 810) from an end user a request for a particular content stream. The process determines (at 820) whether the requested content is cached at that edge server. If so, the cached content is streamed (at 830) from the edge server's cache to the end user. If not, the process forwards (at 840) the request from the edge server to a particular mid-tier server that is preconfigured on the edge server or selected using one of the above described criteria.

The process determines (at 850) whether the requested content is cached at the particular mid-tier server. If so, the cached content is streamed (at 860) from the particular mid-tier server's cache to the edge server. The edge server streams (at 865) the content to the end user while also caching the content in order to serve subsequent end user requests for the same content. If not, the process forwards (at 870) the request from the particular mid-tier server to an appropriate ingest server. The appropriate ingest server is determined based on the content stream identification messages that are sent from the ingest servers to the mid-tier servers. The process streams (at 880) the content from the ingest server to the particular mid-tier server to the edge server then to the end user. Along this path, each of the mid-tier server and edge server cache (at 890) the streaming content such that subsequent requests for the same content stream can be satisfied by the edge server when the same content stream request is made to the same edge server or by the particular mid-tier server when the same content stream request is made from a different edge server that contacts the particular mid-tier server.

III. Computer System

Many of the above-described processes and modules are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer and computer system is meant in its broadest sense, and can include any electronic device with a processor including cellular telephones, smartphones, portable digital assistants, tablet devices, laptops, notebooks, servers, and desktop computers. Examples of computer readable media include, but are not limited to, CD-ROMs, flash drives, RAM chips, hard drives, EPROMs, etc.

Figure 9:
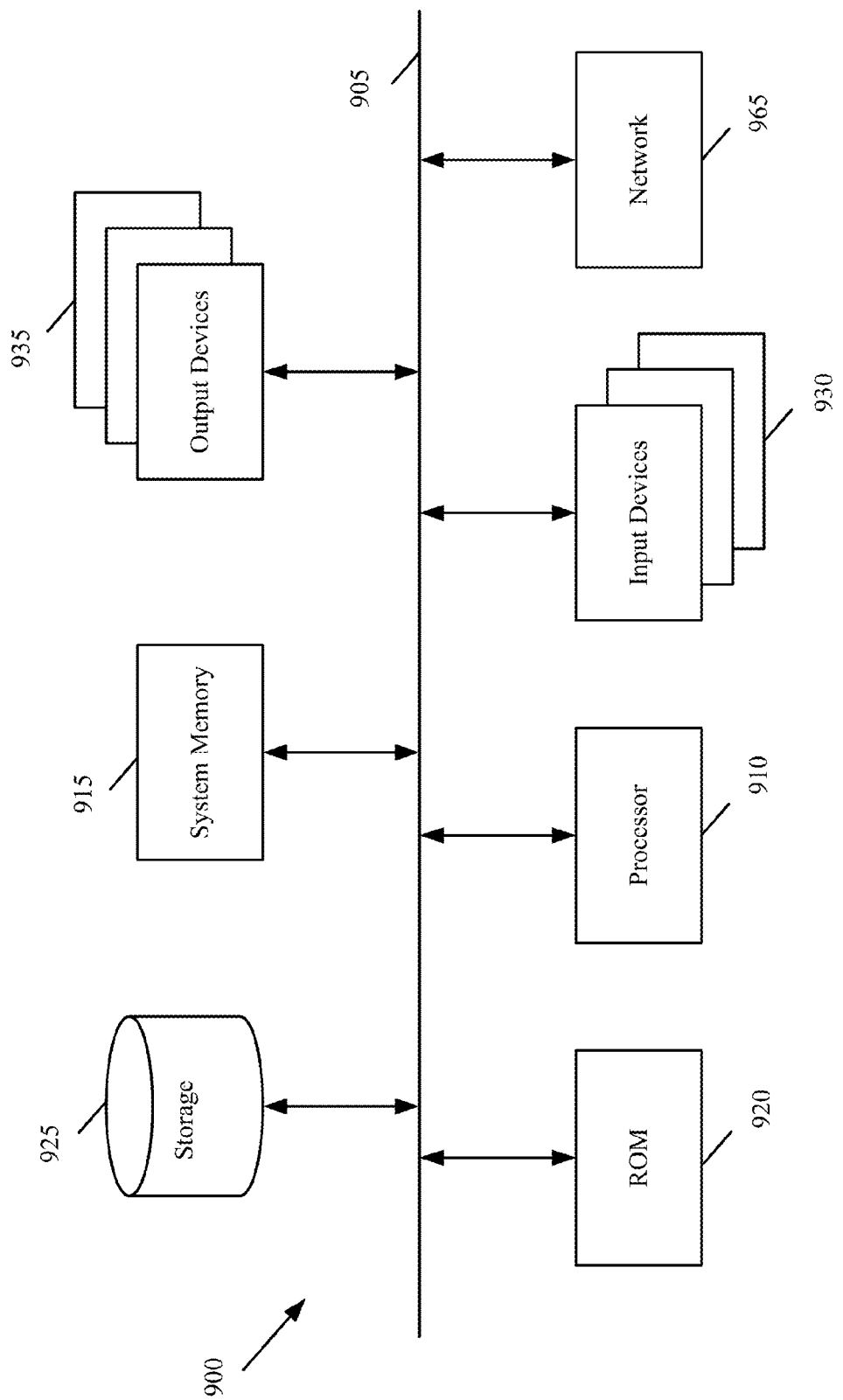
FIG. 9 illustrates a computer system with which some embodiments are implemented.

FIG. 9 illustrates a computer system or server with which some embodiments are implemented. Such a computer system includes various types of computer readable mediums and interfaces for various other types of computer readable mediums that implement the various processes and modules described above (e.g., the content streaming system, the ingest servers of the content streaming system, and the edge servers of the content streaming system). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device Like the permanent storage device 925, the system memory 915 is a read-and-write memory device. However, unlike storage device 925, the system memory is a volatile read-and-write memory, such a random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keypads (including physical keyboards and touchscreen keyboards), pointing devices (also called "cursor control devices"). The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the internet. For example, the computer 900 may be communicably coupled through the network 965 to an ingest server, mid-tier server, edge server, content provider streaming server, or end user device.

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. For a content streaming system comprising at least a load balancer, an administrative site, a first set of ingest servers, and a second set of caching servers, a method for zero configuration scaling of the content streaming system, the method comprising:

configuring the first set of ingest servers with parameters, the parameters comprising identifying credentials enabling a content provider to publish a content stream to at least one ingest server of the first set of ingest servers;

registering the first set of ingest servers with the content streaming system, wherein said registering comprises (i) the first set of ingest servers periodically updating the load balancer with a first set of addresses identifying each available and operational ingest server and (ii) the first set of ingest servers periodically obtaining from the administrative site, a second set of addresses identifying each available and operational caching server from the second set of caching servers;

distributing, by operation of the load balancer, a first content stream to a first ingest server of the first set of ingest servers, selected by the load balancer, based on a most recent periodic update of the first set of addresses from the first set of ingest servers, wherein the first content stream is sent by the content provider using said parameters;

enabling the second set of caching servers access to the first content stream by publishing the first content stream at the first ingest server when said content stream parameters are verified against the parameters configured to the first ingest server and by passing, from the first ingest server to each caching server identified in a most recent copy of the second set of addresses that the first ingest server obtains from the administrative site, a first message identifying at least the first content stream available for streaming to content consumers from the first ingest server;

scaling ingest capacity of the content streaming system by adding a new ingest server to the first set of ingest servers, configuring the new ingest server with said parameters, and registering the new ingest server with the content streaming system by the new ingest server periodically updating the load balancer to include the new ingest server address in the first set of addresses and by the new ingest server periodically obtaining the second set of addresses from the administrative site;

distributing, by operation of the load balancer, a second content stream to the new ingest server selected by the load balancer on a most recent periodic update of the first set of addresses from the first set of ingest servers, wherein the second content stream is sent by the content provider using said parameters; and enabling the second set of caching servers access to the second content stream by publishing the second content stream at the new ingest server when said content stream parameters are verified against the parameters configured to the new ingest server and by passing, from the new ingest server to each caching server identified in a most recent copy of the second set of addresses, obtained by the new ingested server from the administrative site, a second message identifying at least the second content stream that is available for streaming to content consumers from the new ingest server.

2. The method of claim 1 further comprising providing said content provider with an identifier and said parameters for use in publishing a content stream to the content streaming system, wherein said identifier comprises at least one of (i) a particular Internet Protocol (IP) address and (ii) a Uniform Resource Locator (URL) that resolve to an IP address of the load balancer.

3. The method of claim 2, wherein scaling comprises modifying load balancing criteria of the load balancer to include an IP address of the new ingest server in response to a periodic update from the new ingest server.

4. The method of claim 1, wherein said parameters further comprise at least one of an identification token, authentication parameter, and authorization parameter, said parameters for identifying the content provider.

5. The method of claim 1 further comprising registering the second set of caching servers with the content streaming system, wherein said registering comprises (i) the second set of ingest servers periodically updating the administrative site with the second set of addresses identifying each available and operational caching server.

6. The method of claim 1 further comprising receiving a first request for the first content stream at a first caching server of the second set of caching servers and responding to the first request by (i) identifying the first ingest server as a source for the first content stream based on the first set of messages, (ii) retrieving the first content stream from the first ingest server, (iii) caching the first content stream at the first caching server, and (iv) serving the first content stream to a user that submits the first request.

7. The method of claim 6 further comprising receiving a second request for the second content stream at a second caching server of the second set of caching servers and responding to the second request by (i) identifying the second ingest server as a source for the second content stream based on the second set of messages, (ii) retrieving the second content stream from the second ingest server, and (iii) serving the second content stream to a user submitting the second request.

8. The method of claim 6 further comprising receiving a second request for the first content stream at the first caching server and responding to the second request by serving the first content stream from cache to a user submitting the second request.

9. A content streaming system comprising:
a first set of ingest servers;
a second set of mid-tier servers;
a third set of dissemination servers; and
an administrative site storing a configuration, wherein said configuration is updated by the second set of mid-tier servers and retrieved by the first set of ingest servers;
wherein each ingest server of the first set of ingest servers is configured with an address of the administrative server and each ingest server comprises a processor and at least one non-transitory computer-readable storage medium comprising instructions when executed by the processor, (i) ingesting a plurality of content provider content streams published to the content streaming system by a plurality of content providers, (ii) periodically retrieving the configuration from the administrative site using said address, and (iii) periodically passing messages to a subset of the second set of mid-tier servers identified in a most recently retrieved configuration from the administrative site, wherein the messages identify for the subset of mid-tier servers different content streams available for streaming from each ingest server of the first set of ingest servers makes available to the second set of mid tier servers;
wherein each mid-tier server of the second set of mid-tier servers is configured with an address of the administrative site and each mid-tier server comprises a processor and at least one non-transitory computer-readable storage medium comprising instructions, when executed by the processor, periodically registering with the administrative site in order to update the availability of the mid-tier server in the configuration and respond to a request for a particular content stream from a dissemination server by (i) serving the particular content stream to the dissemination server from the non-transitory computer-readable storage of the mid-tier server when the particular content stream is previously cached to the non-transitory computer-readable storage medium of the mid-tier server and (ii) retrieving the particular content stream from an appropriate ingest server and distributing the particular content stream to the dissemination server after buffering some portion of the particular content stream to the non-transitory computer-readable storage medium of the mid-tier server when the particular content stream is not previously cached, and wherein the mid-tier server identifies which ingest server of the first set of ingest servers is the appropriate ingest server, by having available for retrieval the particular content stream based on the messages passed by the first set of ingest servers; and
wherein each dissemination server of the third set of dissemination servers comprises a processor and at least one non-transitory computer-readable storage medium comprising instructions, when executed by the processor, responding to a request for the particular content stream from at least one content consumer by streaming the particular content stream to the content consumer from cache when said particular content stream is cached to the non-transitory computer-readable storage medium of the dissemination server and distributing the particular content stream to the content consumer from a mid-tier server of the second set of mid-tier servers that is selected based on selection criteria when the requested content stream is not cached to the non-transitory computer-readable storage medium of the dissemination server.

10. The content streaming system of claim 9 further comprising a load balancer comprising a processor and at least one non-transitory computer-readable storage medium comprising instructions, when executed by the processor, receiving the content provider content streams sent to a virtual IP address (VIP) associated with the load balancer and distribute the content provider content streams from the VIP to different IP addresses of the first set of ingest servers for ingest based on load balancing criteria.

11. The content streaming system of claim 9, wherein the set of selection criteria comprises at least one of a load balancing function and a hashing function.

12. The content streaming system of claim 9, wherein each mid-tier server of the second set of mid-tier servers is automatically failing over from a first ingest server of the first set of ingest servers to a second ingest server of the first set of ingest servers when a failure associated with the first ingest server is detected and a particular content stream was streaming from the first ingest server is identified as being available at the second ingest server based on the messages passed from the first set of ingest servers.

13. The content streaming system of claim 9, wherein each dissemination server of the third set of dissemination servers is further for automatically failing over from a first mid-tier server of the second set of mid-tier servers to a second mid-tier server of the second set of mid-tier servers when a failure associated with the first mid-tier is detected, wherein, during failover, a particular content stream affected by the failure is streamed from a buffer of the dissemination server to at least one content consumer.

14. A method for zero configuration scaling of a content streaming system, the method comprising:
providing a first set of ingest servers to which content providers supply content for streaming to the content consumers through a second set of caching servers of the content streaming system;
ingesting first and second portions of a particular content stream at a first ingest server of the first set of ingest servers;
passing a first set of messages from the first set of ingest servers to the second set of caching servers, the first set of messages identifying at least the first and second portions of the particular content stream as being available for streaming from the first ingest server;

requesting based on the first set of messages, the first ingest server to stream the first and second portions of the particular content stream to a particular caching server of the second set of caching servers for redistribution to a content consumer requesting the particular content stream from the particular caching server;

distributing the first portion of the particular content stream from the particular caching server to the content consumer while buffering the second portion of the particular content stream to cache of the particular caching server;

redistributing ingest of a third portion of the particular content stream from the first ingest server to a second ingest server of the first set of ingest servers in response to an error preventing ingest of the particular content stream by the first ingest server;

passing a second set of messages from the first set of ingest servers to the second set of caching servers, the second set of messages identifying at least the third portion of the particular content stream as being available for streaming from the second ingest server; and continuing distribution of the particular content stream from the particular caching server to the content consumer without interruption by serving the second portion of the particular content stream from the cache while buffering to the cache, the third portion of the particular content stream from the second ingest server based on the second set of messages.

15. The method of claim 14, wherein said content providers supply said content to the content streaming system using at least one of a particular IP address and URL, the method further comprising distributing said content providers from the particular IP address or URL to IP addresses of different ingest servers of the first set of ingest servers based on load balancing criteria.

16. The method of claim 15 further comprising adding an ingest server to the first set of ingest servers without modifying the particular IP address or URL used by the content providers to supply content to the content streaming system, wherein said load balancing criteria distributes at least one content provider to the added ingest server.

17. The method of claim 14 further comprising determining whether the particular content stream is cached at the particular caching server of the second set of servers.

18. The method of claim 17 further comprising (i) streaming the particular content stream to the content consumer from the cache of the particular caching server when the particular content stream is cached and (ii) requesting the first ingest server to stream the first and second portions of the particular content stream to the particular caching server when the particular content stream is not cached.

* * * * *